US010228830B2

(12) United States Patent
Hou et al.

(10) Patent No.: US 10,228,830 B2
(45) Date of Patent: Mar. 12, 2019

(54) METHOD FOR STARTING APPLICATION PROGRAM, TERMINAL AND NON-TRANSITORY COMPUTER READABLE STORAGE MEDIUM

(71) Applicants: HISENSE ELECTRIC CO., LTD., Shandong (CN); HISENSE USA CORPORATION, Suwanee, GA (US); HISENSE INTERNATIONAL CO., LTD., Shandong (CN)

(72) Inventors: Guilin Hou, Shandong (CN); Fei Huang, Shandong (CN)

(73) Assignees: HISENSE ELECTRIC CO., LTD., Shandong (CN); HISENSE USA CORPORATION, Suwanee, GA (US); HISENSE INTERNATIONAL CO., LTD., Shandong (CN)

(*) Notice: Subject to any disclaimer, the term of this patent is extended or adjusted under 35 U.S.C. 154(b) by 782 days.

(21) Appl. No.: 14/803,463

(22) Filed: Jul. 20, 2015

(65) Prior Publication Data

US 2016/0202880 A1 Jul. 14, 2016

(30) Foreign Application Priority Data

Jan. 9, 2015 (CN) .......................... 2015 1 0012444

(51) Int. Cl.
| | |
|---|---|
| *G06F 9/445* | (2018.01) |
| *G06F 3/0484* | (2013.01) |
| *G06F 3/0481* | (2013.01) |
| *G06F 3/0482* | (2013.01) |
| *G06F 9/4401* | (2018.01) |

(Continued)

(52) U.S. Cl.
CPC ........ *G06F 3/04842* (2013.01); *G06F 3/0482* (2013.01); *G06F 3/0484* (2013.01); *G06F 3/04817* (2013.01); *G06F 9/445* (2013.01); *G06F 9/4401* (2013.01); *G06F 9/451* (2018.02); *G06F 2009/45562* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 2009/0199132 A1* | 8/2009 | Chong | .................. | G06F 9/4401 715/810 |
| 2012/0017024 A1* | 1/2012 | Mulcahy | ............... | G06F 9/4411 710/313 |

* cited by examiner

*Primary Examiner* — Kim Huynh
*Assistant Examiner* — Eric Chang
(74) *Attorney, Agent, or Firm* — Hoffmann & Baron, LLP

(57) ABSTRACT

Embodiments of the present disclosure disclose a method for starting an application program, a terminal and a non-transitory computer readable storage medium, relating to the field of communications, for providing a method capable of quickly starting an application program without starting each functional module of the terminal. In the embodiments of the present disclosure, after a minimum system of the terminal is started, a preset quick start interface is loaded through a display module of the minimum system, wherein the quick start interface at least comprises a plurality of virtual hotkeys for identifying application programs to be started; according to an operation on a virtual hotkey corresponding to starting of an application program, a virtual system executes an operation of starting the application program, wherein the virtual system and a host system of the terminal share physical resources of the terminal.

15 Claims, 3 Drawing Sheets

(51) Int. Cl.
*G06F 9/455* (2018.01)
*G06F 9/451* (2018.01)

METHOD FOR STARTING APPLICATION PROGRAM, TERMINAL AND NON-TRANSITORY COMPUTER READABLE STORAGE MEDIUM

CROSS-REFERENCE TO RELATED APPLICATION

This application claims the benefit and priority of Chinese Patent Application No. 201510012444.1 filed Jan. 9, 2015. The entire disclosure of the above application is incorporated herein by reference.

FIELD

The present disclosure relates to the field of communications, and particularly to a method for starting an application program, a terminal and a non-transitory computer readable storage medium.

BACKGROUND

With update and upgrade of terminals, the development of the terminals increasingly tends to big data system architecture. Under the big data system architecture, when a terminal is started, a minimum system is started first. For example, the minimum system may be minimum resource modules (e.g., a central processing unit (CPU) core, a power module, a display module and the like) in an Android system. Then a driver layer, a middle layer, a user interface (UI) layer, and an application layer are serially loaded, and an application program needing to be started is selected by a user after the application layer is loaded. As can be seen, a long period of time is needed from the start of the terminal to the time when the terminal has a man-machine interaction capability.

SUMMARY

This section provides a general summary of the disclosure, and is not a comprehensive disclosure of its full scope or all of its features.

Embodiments of the disclosure provide a method and device for automatically adjusting the function of a control button, and a smart terminal so as to address the problem in the prior art of a failure in operation when the control button of the smart terminal cannot be adjusted automatically.

One aspect of the disclosure relates to a method for starting an application program, the method including:

after a minimum system of a terminal is started, loading a preset quick start interface through a display module of the minimum system, wherein the quick start interface at least comprises a plurality of virtual hotkeys for identifying application programs to be started;

executing, by a virtual system, an operation of starting an application program, according to an operation on a virtual hotkey corresponding to starting of the application program;

wherein the virtual system and a host system of the terminal share physical resources of the terminal.

Another aspect of the disclosure relates to a terminal, the terminal including:

one or more processors; and a memory storing one or more computer readable program codes that, when executed by the one or more processors, perform operations comprising:

after a minimum system of a terminal is started, loading a preset quick start interface through a display module of the minimum system, wherein the quick start interface at least comprises a plurality of virtual hotkeys for identifying application programs to be started;

executing, by a virtual system, an operation of starting an application program, according to an operation on a virtual hotkey corresponding to starting of the application program;

wherein the virtual system and a host system of the terminal share physical resources of the terminal.

Yet another aspect of the disclosure relates to a non-transitory computer readable storage medium that stores one or more programs that, when performed by a terminal, perform operations comprising:

after a minimum system of a terminal is started, loading a preset quick start interface through a display module of the minimum system, wherein the quick start interface at least comprises a plurality of virtual hotkeys for identifying application programs to be started;

executing, by a virtual system, an operation of starting an application program, according to an operation on a virtual hotkey corresponding to starting of the application program;

wherein the virtual system and a host system of the terminal share physical resources of the terminal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
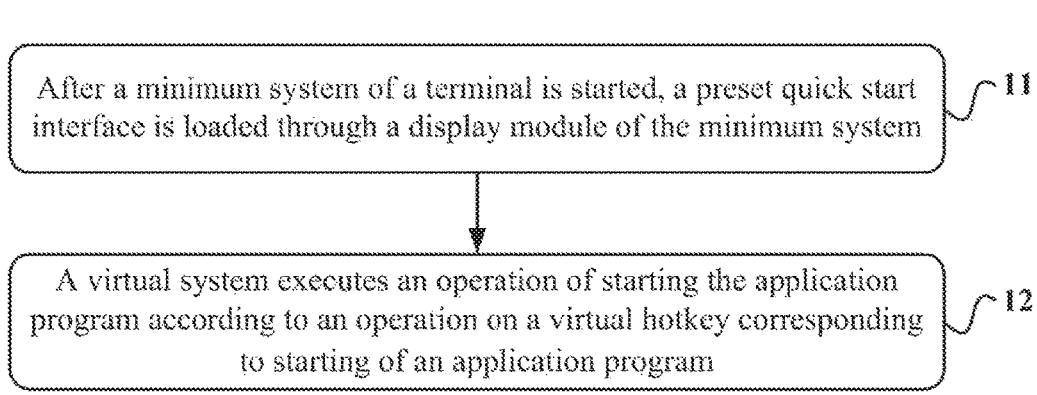
FIG. 1 is a flow schematic diagram of a method for starting an application program according to an embodiment of the present disclosure.

Example embodiments will now be described more fully with reference to the accompanying drawings. It shall be appreciated that the particular embodiments described here are merely intended to illustrate but not limit the disclosure.

In an embodiment, a minimum system in a terminal is started first, then initialization parameters of hardware in the minimum system are transmitted to a driver layer to inform the driver layer which are peripheral equipment of the terminal and which functional modules are to be started, and then functional modules of the terminal are sequentially started.

Generally, after acquiring all hardware parameters (such as an I2C interface parameter, a Bluetooth interface parameter and the like), address information, data format information, electrical characteristic information and other parameters, the terminal system transmits these parameters to the driver layer, a middle layer converts the logical address, logical data format, logical initialized data and the like transmitted from the driver layer into formats which can be identified by an application layer, and transmits the converted parameters to the application layer, further, the application layer starts the functional modules (such as a Bluetooth module and a WIFI module) of the terminal according to the parameters transmitted from the middle layer, and so far, a user can perform corresponding operations on keys on a UI.

For example, the minimum system of television equipment is composed of a main IC (integrated circuit), a power supply network, a DDR (Double Data Rate, double data rate synchronous dynamic random access memory) and a flash (memory).

As can be seen above, the minimum system of the television is a complete system, and the television can work after the minimum system is started. However, for the starting of peripheral equipment, a corresponding driver also needs to be provided besides defining basic electrical signals, so that double parties carry out the cognition on a protocol layer. For example, for functional modules such as a WIFI module and a camera module, interface protocols also need to be defined besides basic level parameters and interfaces, and these interface protocols belong to data information of the driver layer, which may be defined as basic hardware protocols in the embodiments of the present disclosure. The middle layer works to establish a communication between the driver layer and the application layer and converts useful information acquired from the outside or other module by the driver layer into logical data which can be identified by the application layer. The application layer starts an application by using the logical data, to reproduce a scenario interface or information of the application.

However, in the aforementioned flow of starting the operating system, a man-machine interaction mode can be realized after each functional module is started.

To avoid the above problem, a method for starting an application program, a terminal and a non-transitory computer readable storage medium provided by the embodiments of the present disclosure will be described below.

It should be noted that the embodiments of the present disclosure are applicable to various terminals or smart terminals, and particularly applicable to an implementation method for quickly starting a terminal through a hotkey (which may be a shortcut key), wherein the hotkey is not limited to a virtual hotkey but also may be a key on a matching remote controller or a button on a terminal body. In the embodiments of the present disclosure, quick start of an operating system is not limited to using the hotkey, and an operation specific to an application program may be encapsulated as a hotkey to realize quick start of the application program. In the embodiments of the present disclosure, resources may be randomly allocated in a system by using a virtual machine. In this way, the preset start sequence of the operating system can be broken, the system resource modules to be started are reduced, quick start of an application program is realized, waiting of a user is reduced, and a terminal starting solution with relatively high customization degree is provided for the user.

The minimum system in the embodiments of the present disclosure is not only a minimum system of hardware, but also may include an Android system packet. The virtual machine has a platform type function independent from the Android system packet, and can be used for quickly calling platform resources to ensure quick start of the application layer. The virtual machine has the advantage that the virtual machine does not need to adapt to a hardware driver layer but faces the middle layer and the application layer. That is to say, the virtual machine is used for quickly calling and decompressing data of the application layer. Quick start of an application program is realized by using the virtual machine in the embodiments of the present disclosure.

FIG. 1 is a flow schematic diagram of a method for starting an application program according to an embodiment of the present disclosure. As shown in FIG. 1, the method may include the following operations.

Operation 11: after a minimum system of a terminal is started, a preset quick start interface is loaded through a display module of the minimum system, wherein the quick start interface at least includes a plurality of virtual hotkeys for identifying application programs to be started.

Operation 12: a virtual system executes an operation of starting the application program according to an operation on a virtual hotkey corresponding to starting of an application program, wherein the virtual system and a host system of the terminal share physical resources of the terminal.

Alternatively, in the above operation 11, after the minimum system of the terminal is started, the method further includes: the host system executes an operation of starting a current operating system when the virtual system executes the operation of starting the application program.

Alternatively, in the above operation 11 or operation 12, the host system executes the operation of starting the current operating system in the following manner: acquiring, by the host system, a driver layer parameter, consisting of analog signals, of each functional module of the terminal; converting the driver layer parameter into an application layer parameter consisting of logical signals according to a preset rule; and starting, by the host system, the functional modules one by one according to the application layer parameters.

Alternatively, in operation 11, the virtual system executes the operation of starting the application program in the following manner: determining a functional module required to be started for starting the application program and an initialization parameter of the application program; calling a pre-stored application layer parameter of the functional module required to be started, wherein the pre-stored application layer parameter is previously extracted and stored by the virtual system when the functional module is started; starting the corresponding functional module according to the pre-stored application layer parameter; and starting the application program according to the initialization parameter by using the started functional module.

Alternatively, in operation 11 or operation 12, after the host system starts all functional modules of the terminal, the method further includes: the virtual system maps data produced by starting the application program to the host system, to indicate to the host system to run the application program according to the data after the host system receives the data produced by starting the application program.

Alternatively, before the virtual system maps the data produced by starting the application program to the host system, the method further includes: after the virtual system detects an operation of a user on the started application program, the virtual system determines whether the host system has responded to the operation, if not, then the virtual system responds to the operation; otherwise, the virtual system does not respond to the operation.

Alternatively, the virtual system determines whether the host system has responded to the operation as follows: determining, by the virtual system, a thread for responding to the operation in the host system; determining, by the virtual system, whether the thread has been occupied, if so, determining that the host system has responded to the operation; otherwise, determining that the host has not responded to the operation.

As can be seen above, the functional modules of the terminal still need to be started one by one after the minimum hardware system of the terminal is started in the prior art, whereas in the embodiment of the present disclosure, an instruction of an application program required to be started by a user may be acquired through the quick start interface after the minimum hardware system of the terminal is started, and the virtual system executes the operation of starting the application program without waiting for starting of all functional modules of the terminal, so that quick start of the application program is realized.

The embodiment of the present disclosure will be described in detail below.

Figure 2:
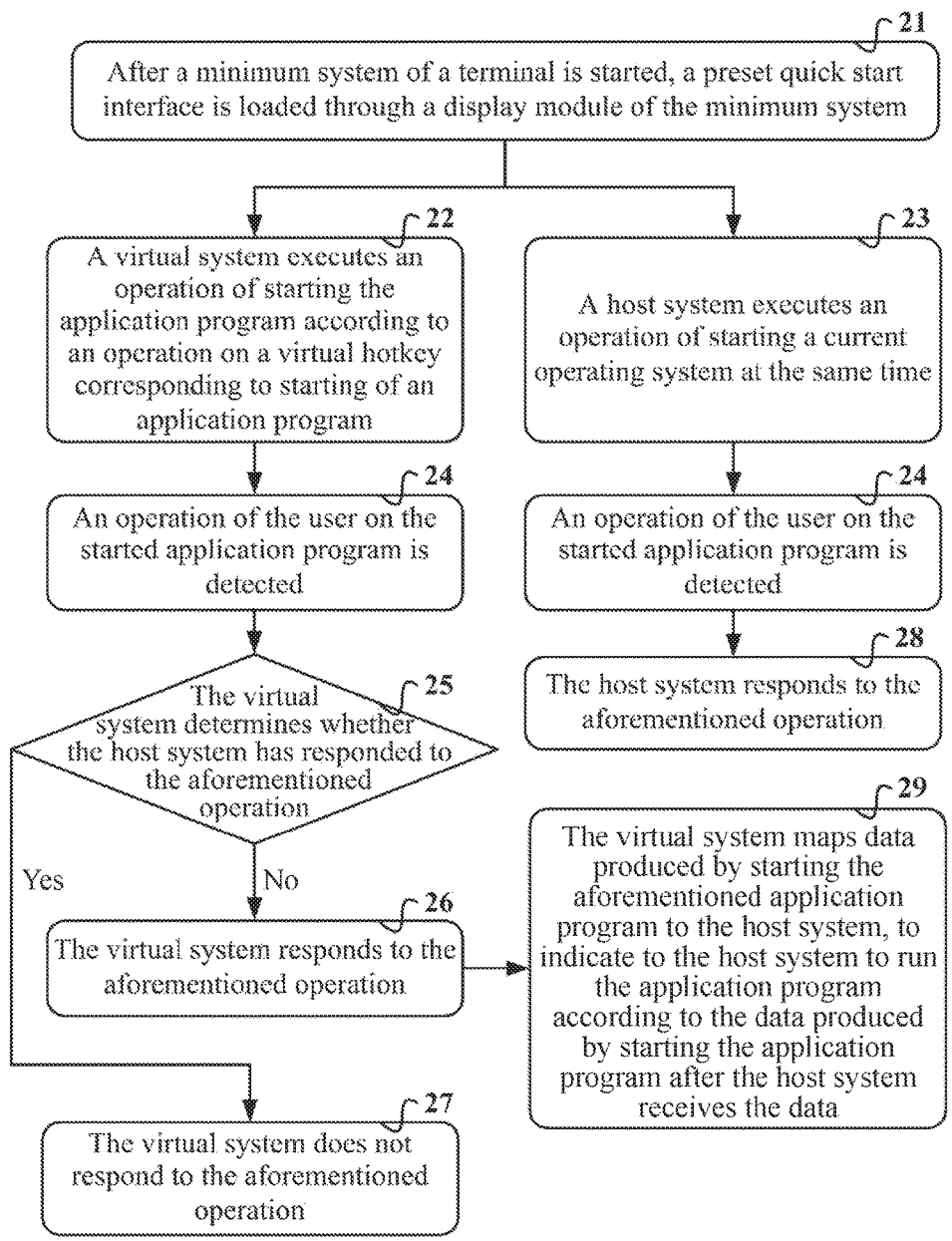
FIG. 2 is a flow schematic diagram of parallel running of a virtual system and a host system according to an embodiment of the present disclosure.

FIG. 2 shows a flow schematic diagram of parallel running of a virtual system and a host system according to an embodiment of the present disclosure. As shown in FIG. 2, the method may include the following operations.

Operation 21: after a minimum system of a terminal is started, a preset quick start interface is loaded through a display module of the minimum system.

In an embodiment, the quick start interface at least includes a plurality of virtual hotkeys for identifying application programs to be started; and the operation corresponding to each virtual hotkey may be preset.

In an implementation, after the minimum system is started, a scenario display of a digital RGB is virtualized by using a display part of the minimum system, and the scenario displays a characterization value related to an application program (APP); and each virtual hotkey characterizes an operation (such as an operation for starting application program) with certain priority. The operation can call data of the virtual RGB scenario display, so that the RGB data is sent to a TCON (timing controller) of a display screen and processed, and then the purpose of displaying an image is achieved.

Because the started minimum system is a complete system and does not have relevant parameters of an application system, the minimum system does not have relevant characteristics of a UI layer, and data processing or logic processing of the minimum system is relatively simple. The response to a virtual hotkey is direct data transmission, so for each pre-installed application program or an application program provided by a third party, the application program needs to be processed. For example, the specific processing process is referred as application program virtualization, i.e., when an application program A is pre-installed in equipment, the characteristic (e.g., application program name) of the application program A in the software system of the equipment needs to be compressed and is processed into a digital RGB signal, and a stack pointer is added to the minimum system, pointing to a designated address space, and digital RGB display data of the application program A is stored in the address space. The purpose of adding the stack pointer is to establish an extendable pointer system or a data system in the minimum system, so that the pointer system or the data system can transmit the physical address information represented by the RGB display data representing the application module to the quick start interface when an application program is newly installed.

Operation 22 to operation 23: a virtual system executes an operation of starting the application program according to an operation on a virtual hotkey corresponding to starting of an application program; and a host system executes an operation of starting a current operating system at the same time.

In an embodiment, a user may click or select a virtual hotkey on the quick start interface, to trigger the starting of the application program corresponding to the virtual hotkey.

In the embodiment of the present disclosure, the virtual system and the host system of the terminal share physical resources of the terminal. It should be noted that, the above operation 22 and operation 23 may be simultaneously executed by the virtual system and the host system by using different threads respectively.

In an embodiment, after the minimum system of equipment is started, the data corresponding to the aforementioned pointer system is started. When the user clicks or touches the virtual hotkey, the minimum system may respond to a click or touch by interrupting operation to execute the data of a certain application program. The purpose that the minimum system responds to the click or touch operation herein is to interrupt original start paths of equipment system, that is to say, to interrupt the original flow of starting and loading all driver layers, starting and loading all middle layers, and starting and loading all application layers till the application program corresponding to the click or touch is started. The minimum system responds to the application program selected by the user by starting a virtual machine. It should be noted that the interrupt herein is not to stop running of the program, but just serves as a beginning sign of a next node of the program.

In this case, after the minimum system loads the data in the address space and runs the stack pointer, the stack pointer may point to the driver layer, the middle layer and the application layer in the virtual system corresponding to the application program A. Thus, a program in the virtual system rather than an original program in the host is executed in next step.

For example, the operation corresponding to the virtual hotkey selected in the loaded quick start interface by the user is to start the application program A, the program pointer points to the driver layer relevant to the application program A (to spontaneously call driver packets of the driver layer of the application A and gradually perform decompression, initialization, logical operation, and data transmission). Meanwhile, the middle layer corresponding to the application program A is started, without waiting for the driver layer to transmit data information to the middle layer. Because the user cannot carry out any other operation at the moment, differential data information is not produced in this procedure.

As another example, the information transmitted before the driver layer of a camera is started is simple basic information, which will not be changed. After the application program is started, the data transmitted by the driver layer may be different from that transmitted by the driver layer before the camera is started. In the initialization process, the data transmitted by the hardware driver layer are consistent, and this group of data can be memorized or extracted. Thus, the virtual system performs computing by using the extracted initialized data as the basic data input to the middle layer.

Therefore, the virtual system may directly extract or call an application layer parameter of a functional module required to be started for starting a designated application program, and can start the corresponding functional module according to the extracted application layer parameter. Further, the virtual system starts the application program by using the started functional module according to the initialization parameter of the application program.

The virtual system in the embodiment of the present disclosure may include at least a virtual machine and an adaptive management system, wherein the adaptive management system takes charge of extracting, marking, and storing the application layer parameter, middle layer parameter, and driver layer parameter of each functional module, transmitting the application layer parameters, the middle layer parameters, or the driver layer parameters to the virtual machine according to a scheduling rule for computing, and mapping computation results of the virtual machine to the host system of the terminal. The virtual machine performs computation by using the application layer parameters, the middle layer parameters, and the driver layer parameters provided by the adaptive management system, and differential data of a user. Herein, the differential data of the user indicates other operation instructions that are input by the user for the application program after the application program is started. In the embodiment of the disclosure, after the application program is started, the host system of the terminal may not be normally started, and the host system does not have the capability of responding to the other operation instructions input by the user, so that the other operation instructions must be responded by the virtual machine in the virtual system.

In an embodiment, the application layer is a result of computation of logical data. If a group of appropriate input data can be defined, then the output data can meet the requirement. When a user does not perform any other operation or a user cannot perform an operation in a current state, the corresponding data of the user is a group of initialized data. The initialized data has a fixed format and can be extracted. The adaptive management system is used for extracting the data with the fixed format in this process, and storing the data according to the format, address, and scheduling logic of the adaptive management system.

Original serial computation of the driver layer, the middle layer and the application layer is changed into present parallel computation by the virtual machine. The output information of the hardware layer extracted by the adaptive management system is used as input information of the driver layer, the output information of the driver layer is used as input information of the middle layer, and the output information of the middle layer is used as input information of the application layer. In this case, the data is virtualized by the virtual machine through the adaptive management system extracting and storing the information in the embodiment of the present disclosure.

The other function of the virtual machine is to duplicate a driver module program of the driver layer, a middle layer module program and an application layer module program related to an application in the original system. In this process, the adaptive management system is used for establishing appropriate marks or establishing indexes similar to that in a data system. The adaptive management system marks program blocks through valid index information, to provide accurate information to the virtual machine, so that the virtual machine can accurately select a corresponding program module for computing.

When duplicating the corresponding program block to its memory space for computing, the virtual machine acquires corresponding initialized data according to accurate data management of the adaptive management system, so as to satisfy parallel operation of the system. Further, the data of the virtual machine needs to be duplicated to an application space and a memory space of the host system, so as to realize normal start of the system. This duplication process is actually a data address mapping process, since the virtual machine simulates the process of initialization of normal program start. The requirement of normal start of a program may be satisfied as long as the data on the corresponding address is mapped to the current address space and the interaction of thread control is completed.

For example, when a user performs an operation on the application program A, the application program A is running on the virtual machine. The operation of the user may be transmitted to the driver layer, the middle layer, and the application layer in the form of a message. The differential data of the user or the data acquired from the outside is computed through the driver layer, and the computation result is transmitted to the middle layer and the application layer. This process is the same as the operating process in the prior art, except that the response of this process is completed in the virtual machine.

Meanwhile, when the virtual system starts the designated application program, the host system executes the operation of starting the current operating system according to the prior art.

In an embodiment, the host system acquires a driver layer parameter, consisting of analog signals, of each functional module of the terminal. The host system converts the driver layer parameter into an application layer parameter consisting of logical signals according to a preset rule. The host system starts functional modules one by one according to application layer parameters, thus completing the operation of starting the current operating system.

Operation 24: an operation of the user on the started application program is determined.

In an embodiment, in this operation 24, the host system may be starting the current operating system, or the host system has completed the operation of starting the current operating system, or the host system may have not executed the operation of starting the current operating system. Thus, the virtual system and the host system may simultaneously detect the operation of the user on the started application program. Further there is a need to determine that the operation of the user is executed by the virtual system or the host system.

Operation 25: the virtual system determines whether the host system has responded to the aforementioned operation. If the host system has not responded, then the virtual system executes operation 26. Otherwise, if the host system has responded, then the virtual system executes operation 27.

Operation 26: the virtual system responds to the aforementioned operation.

In an embodiment, the virtual system performs the operation according to the operating instruction of the user, and stores the produced differential data, further returning to operation 25 till the virtual system stops running.

Operation 27: the virtual system does not respond to the aforementioned operation.

In an embodiment, the operation of the user has been responded by the host system at operation 28, which means that the host system has completed the operation of starting the current operating system at the moment, and can respond to the operation of the user using each functional module, and the host system can further execute the corresponding operation according to the prior art.

In an embodiment, the virtual system determines a thread for responding to the aforementioned operation in the host system, and determines whether the thread has been occupied. If the thread has been occupied, it is determined that the host system has responded to the aforementioned operation. Otherwise, if the thread has been not been occupied, it is determined that the host system has not responded to the aforementioned operation.

It should be noted that, operation 29 needs to be executed after operation 26.

Operation 29: the virtual system maps data produced by starting the aforementioned application program to the host system, to indicate to the host system to run the application program according to the data produced by starting the application program after the host system receives the data.

In an embodiment, after the virtual machine completes the input and output of the aforementioned data, the data of the virtual machine needs to be mapped to the memory space of the host system. After the adaptive management system completes this process, the current thread needs to be switched to a main thread. Then, the main thread performs reading, computation and output of data in the memory space used by the host system. Thus, alternation of the virtual machine and the host system is realized.

After the virtual machine starts the application program A and when the user operates the application program A again, the operating process is performed according to a normal starting mode, except that this process needs to be mapped to the thread used by the host system according to a data mapping form, rather than being performed in the virtual machine (e.g., because the data in the virtual machine is based on basic information and cannot meet differentiated requirements of a user, once the user performs an operation, the system still makes a response in the virtual machine, and correspondingly, data acquisition and transmission are wrong). The operation of the user is correspondingly transmitted to the bottom layer of the host system, the adaptive management system informs the driver layer, the middle layer, and the application layer in the form of a message at the moment, the data stored in the virtual system is mapped to each address space of the host system, and alternation of threads and alternation of data are gradually completed.

For example, after the user operates on the application program A, a message representing the operation arrives at the driver layer, then the driver layer calls hardware equipment to acquire external differential data, converts the differential data into logical data required by a protocol, and further transmits the logical data to the virtual machine. The virtual machine informs the virtual driver layer to perform data computation, to transmit user data information to the middle layer for converting the user data information into application data required for logical conversion performed by the application layer. Process conversion and data transmission are completed once every computation in this process (e.g., the data transmission includes transmission of a decompressed program and transmission of a stack pointer, and the data transmission of the user is also included in this process). Thus, interchange of processes and data from the virtual machine to a normal system is realized.

The adaptive management system controls mapping and interchange of data on the corresponding address in this process, and simultaneously completes sequential data connection of three modules. The driver layer, the middle layer, and the application layer are sequentially mapped in the connection.

In an embodiment, the method for starting application program provided above may be realized by using an adaptive software solution. The adaptive software solution is a flow innovation of a software system. The software system is divided into the following four parts:

1. The first part depends on software system design of a separated region, namely, realizing associated selective start of the separated region of a modularized program, which is, automatically starting different program blocks to complete starting.

2. The second part of the software adaptive solution embodies the advantageous performances of the virtual system on the aspects of application program decompression, application program starting running, driver layer data calling, and data interchange.

3. The third part of the software system is a software adaptive functional module, which is used for coordinating the management of each module and the interaction of and decision on message instructions.

4. The fourth part of the software system is a virtual machine module in which an environment which may be loaded by the application program is virtualized by using the virtual machine, the application may exist in the form of decompressed large data after being decompressed from a compressed data in such environment, data and a corresponding data structure are established at the moment, and a logic associated with the key awakening form of a hardware platform is established in the virtual environment.

As can be seen, the embodiment of the present disclosure may manage and control the logic under a multi-thread working mode and further realize such multi-thread operating mode.

Based on the same inventive concept, an embodiment of the present disclosure further provides a terminal. The method corresponding to the terminal is the method for starting application program provided by the embodiment of the present disclosure above. So for the implementation of the embodiment of the present disclosure directed to the terminal, reference may be made to the implementation of the method, which is not repeated.

In an embodiment, the terminal according to the present disclosure includes:
one or more processors; and
a memory;
wherein the memory stores one or more computer readable program codes, and the one or more processors are configured to execute the one or more computer readable program codes to perform:
after a minimum system of a terminal is started, loading a preset quick start interface through a display module of the minimum system, wherein the quick start interface at least comprises a plurality of virtual hotkeys for identifying application programs to be started;
executing, by a virtual system, an operation of starting an application program, according to an operation on a virtual hotkey corresponding to starting of the application program;
wherein the virtual system and a host system of the terminal share physical resources of the terminal.

In an embodiment, after the minimum system of the terminal is started, the one or more processors are further configured to execute the one or more computer readable program codes to perform:
executing, by the host system, an operation of starting a current operating system when the virtual system executes the operation of starting the application program.

In an embodiment, the one or more processors are further configured to execute the one or more computer readable program codes to perform:
acquiring, by the host system, a driver layer parameter, consisting of analog signals, of each functional module of the terminal;
converting the driver layer parameter into an application layer parameter consisting of logical signals according to a preset rule; and starting, by the host system, functional modules one by one according to application layer parameters.

In an embodiment, the one or more processors are further configured to execute the one or more computer readable program codes to perform:

determining a functional module required to be started for starting the application program and an initialization parameter of the application program;

calling a pre-stored application layer parameter of the functional module required to be started, wherein the pre-stored application layer parameter is previously extracted and stored by the virtual system when the functional module is started;

starting the functional module required to be started according to the pre-stored application layer parameter; and starting the application program according to the initialization parameter by using the started functional module.

In an embodiment, the one or more processors are further configured to execute the one or more computer readable program codes to perform:

mapping, by the virtual system, data produced by starting the application program to the host system, to indicate to the host system to run the application program according to the data produced by starting the application program after the host system receives the data.

In an embodiment, wherein the one or more processors are further configured to execute the one or more computer readable program codes to perform:

after the virtual system detects an operation of a user on the application program that is started, determining, by the virtual system, whether the host system has responded to the operation; if the host system has not responded to the operation, responding to the operation by the virtual system; otherwise, if the host system has responded to the operation, not responding to the operation by the virtual system.

In an embodiment, wherein the one or more processors are further configured to execute the one or more computer readable program codes to perform:

determining, by the virtual system, a thread for responding to the operation in the host system; and determining, by the virtual system, whether the thread has been occupied. If the thread has been occupied, it is determined that the host has responded to the operation. Otherwise, if the thread has not been occupied, it is determined that the host has not responded to the operation.

Figure 3:
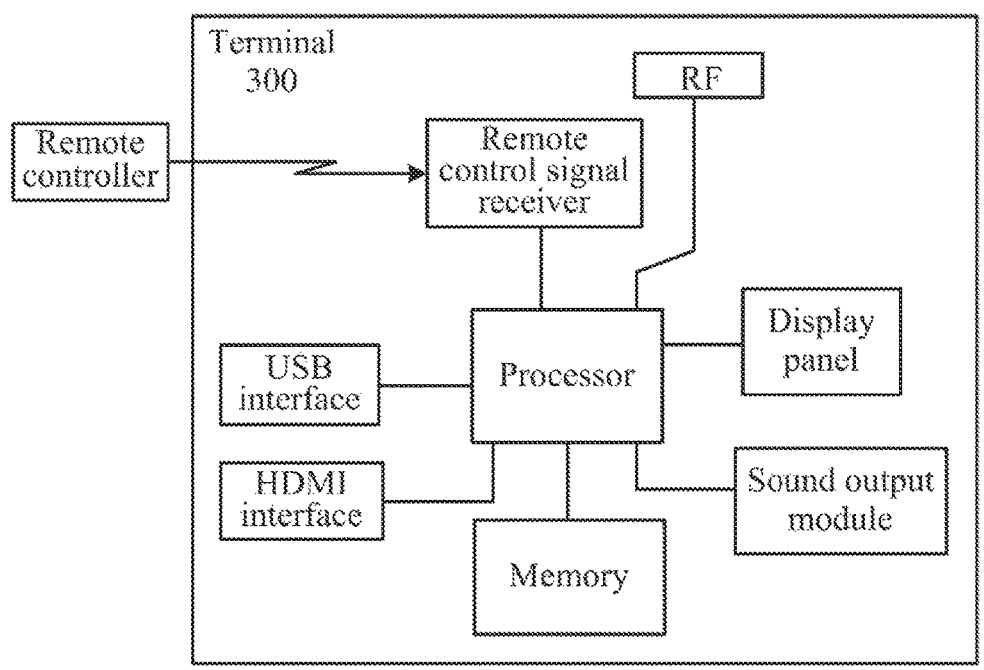
FIG. 3 is a structural schematic diagram of a terminal according to an embodiment of the present disclosure.

Further as illustrated in FIG. 3, the terminal 300 according to the present disclosure can include a memory, an input unit, an output unit, one or more processors and other components. Those skilled in the art can appreciate that the terminal 300 will not be limited to the structure as illustrated in FIG. 3 but can include more or less components than those as illustrated or some components which are combined or some components which are arranged otherwise.

The memory can be configured to store software programs and modules, and the processor can run the software programs and the modules stored in the memory to perform respective functional applications and data processing. The memory can include a high-speed random access memory and can also include a nonvolatile memory, e.g., at least one magnetic disk memory, flash memory, or another volatile solid-state memory. Moreover, the memory can also include a memory controller to provide the processor and an input unit with an access to the memory.

The processor is a control center of the terminal 300, and connects the respective components throughout the terminal through various interfaces and lines, so that the processor runs or executes the software programs and/or the modules stored in the memory, and invokes the data stored in the memory to perform the respective functions of the terminal and to process the data so as to supervise the terminal as a whole. Alternatively, the processor can include one or more processing cores. Alternatively, the processor can be integrated with an application processor and a modem processor, where the application processor generally handles an operating system, user interfaces, applications, etc., and the modem processor generally handles wireless communication. As can be appreciated, the modem processor above may not be integrated into the processor.

The terminal 300 can further include a TV and radio receiver, a high-definition multimedia interface, a USB interface, an audio and video input component, and other input units, and the input units can further include a remote control receiver to receive a signal transmitted by a remote controller. Moreover, the input units can further include a touch sensitive surface and another input device, where the touch sensitive surface can be embodied in various types of resistive, capacitive, infrared, surface sound wave and other types, and the other input device can include but will not be limited to one or more of a physical keyboard, functional keys (e.g., a power-on or power-off press key, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by the user or information provided to the user and various graphic user interfaces of the terminal 300, where these graphic user interfaces can be composed of graphics, texts, icons, videos, and any combination thereof. For example, the display panel can be embodied as a Liquid Crystal Display (LCD), an Organic Light-Emitting Diode (OLED), a flexible display, a 3D display, a Cathode Ray Tube (CRT), a plasma display panel, etc.

The terminal 300 can further include at least one sensor (not illustrated), e.g., an optical sensor, a motion sensor, as well as other sensors. Particularly, the optical sensor can include an ambient light sensor and a proximity sensor, where the ambient light sensor can adjust the brightness of the display panel according to the luminosity of ambient light rays, and the proximity sensor can power off the display panel and/or backlight when the terminal 300 moves to certain location. The terminal 300 can be further configured with a gyroscope, a barometer, a hygrometer, a thermometer, an infrared sensor, as well as other sensors.

The terminal 300 can further include an audio circuit (not illustrated), a speaker and a microphone which can provide an audio interface between the user and the terminal 300. The audio circuit can convert received audio data into an electric signal and transmit the electric signal to the speaker, which is converted by the speaker into an audio signal for output. On the other hand, the microphone converts a collected audio signal into an electric signal which is received by the audio circuit and then converted into audio data, and the audio data is further output to the processor for processing and then transmitted to another display device, for example, or the audio data is output to the memory for further processing. The audio circuit may further include an earphone jack for communication between a peripheral earphone and the terminal 300.

Moreover, the terminal 300 can further include a Radio Frequency (RF) circuit. The RF circuit can be configured to receive and transmit a signal. Typically, the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the terminal 300 can further include a web cam, a Bluetooth module, etc.

Moreover, an embodiment of the present disclosure herein further provides a non-transitory computer readable storage medium, which may be non-transitory computer readable storage medium in the storage devices in above embodiments, or may be standing alone non-transitory computer readable storage medium that is not installed into electronic devices. The non-transitory computer readable storage medium may store one or more programs. Such programs may be performed by one or more processors to execute the methods in the embodiments as illustrated in FIGS. 1 and 2. The illustration of FIGS. 1 and 2 shows the details of the method, which is not repeated here.

In conclusion, in the embodiments of the present disclosure, large data is loaded by using a virtual application platform, namely a virtual system is pre-started in the system, and advanced loading of data or advanced decompression of an application program and data interchange are performed through a virtual application program. After the minimum system is started, the quick start of the application program is realized by using the interaction of large data between the virtual application program and the host system.

The disclosure has been described in a flowchart and/or a block diagram of the method, the device (system) and the computer program product according to the embodiments of the disclosure. It shall be appreciated that respective flows and/or blocks in the flowchart and/or the block diagram and combinations of the flows and/or the blocks in the flowchart and/or the block diagram can be embodied in computer program instructions. These computer program instructions can be loaded onto a general-purpose computer, a specific-purpose computer, an embedded processor, or a processor of another programmable data processing device to produce a machine so that the instructions executed on the computer or the processor of the other programmable data processing device create means for performing the functions specified in the flow(s) of the flowchart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flowchart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flowchart and/or the block(s) of the block diagram.

Although the embodiments of the disclosure have been described, those skilled in the art benefiting from the underlying inventive concept can make additional modifications and variations to these embodiments. Therefore, the appended claims are intended to be construed as encompassing the embodiments and all the modifications and variations coming into the scope of the disclosure.

Evidently, those skilled in the art can make various modifications and variations to the disclosure without departing from the scope of the disclosure. Thus, the disclosure is also intended to encompass these modifications and variations thereto so long as the modifications and variations come into the scope of the claims appended to the disclosure and their equivalents.

The invention claimed is:

1. A method of starting an application program, the method comprising:

after a minimum system of a terminal is started, loading a preset quick start interface through a display module of the minimum system, wherein the quick start interface comprises at least a plurality of virtual hotkeys that identify application programs to be started;

in response to an operation on a virtual hotkey of the quick start interface indicating an application program that is to be started, executing, by a virtual system, an operation of starting the application program that corresponds to the virtual hotkey;

after the minimum system of the terminal is started, executing, by a host system, an operation of starting a current operating system while the operation of starting the application program is executed by the virtual system, wherein the virtual system and the host system of the terminal share physical resources of the terminal;

after the host system starts all functional modules of the terminal, mapping, by the virtual system, data produced by starting the application program to the host system, to indicate to the host system to run the application program according to the data produced by starting the application program after the host system receives the data; and before the virtual system maps the data produced by starting the application program to the host system, the method further comprises:

after the virtual system detects an operation of a user on the application program that is started, determining, by the virtual system, whether the host system has responded to the operation;

if the host system has not responded to the operation, responding to the operation by the virtual system; and if the host system has responded to the operation, not responding to the operation by the virtual system.

2. The method of claim 1, wherein the host system executes the operation of starting the current operating system in the following manner:

acquiring, by the host system, a driver layer parameter, consisting of analog signals, of each functional module of the terminal;

converting the driver layer parameter into an application layer parameter consisting of logical signals according to a preset rule; and starting, by the host system, functional modules one by one according to application layer parameters.

3. The method of claim 2, wherein the virtual system executes the operation of starting the application program in the following manner:

determining a functional module required to be started for starting the application program and an initialization parameter of the application program;

calling a pre-stored application layer parameter of the functional module required to be started, wherein the pre-stored application layer parameter is previously extracted and stored by the virtual system when the functional module is started;

starting the functional module required to be started according to the pre-stored application layer parameter; and starting the application program according to the initialization parameter by using the functional module that is started.

4. The method of claim 1, wherein the virtual system executes the operation of starting the application program in the following manner:
  determining a functional module required to be started for starting the application program and an initialization parameter of the application program;
  calling a pre-stored application layer parameter of the functional module required to be started, wherein the pre-stored application layer parameter is previously extracted and stored by the virtual system when the functional module is started;
  starting the functional module required to be started according to the pre-stored application layer parameter; and
  starting the application program according to the initialization parameter by using the functional module that is started.

5. The method of claim 1, wherein the determining, by the virtual system, whether the host system has responded to the operation comprises:
  determining, by the virtual system, a thread for responding to the operation in the host system;
  determining, by the virtual system, whether the thread has been occupied;
  if the thread has been occupied, determining that the host system has responded to the operation; and
  if the thread has not been occupied, determining that the host system has not responded to the operation.

6. A terminal comprising:
  one or more processors; and
  a memory storing one or more computer readable program codes that, when executed by the one or more processors, perform operations comprising:
  after a minimum system of the terminal is started, loading a preset quick start interface through a display module of the minimum system, wherein the quick start interface comprises at least a plurality of virtual hotkeys that identify application programs to be started;
  in response to an operation on a virtual hotkey of the quick start interface indicating an application program that is to be started, executing, by a virtual system, an operation of starting the application program that corresponds to the virtual hotkey;
  after the minimum system of the terminal is started, executing, by a host system, an operation of starting a current operating system while the operation of starting the application program is executed by the virtual system,
  wherein the virtual system and the host system of the terminal share physical resources of the terminal;
  mapping, by the virtual system, data produced by starting the application program to the host system, to indicate to the host system to run the application program according to the data produced by starting the application program after the host system receives the data; and
  before the virtual system maps the data produced by starting the application program to the host system, the operations further comprise:
    after the virtual system detects an operation of a user on the application program that is started, determining, by the virtual system, whether the host system has responded to the operation;
    if the host system has not responded to the operation, responding to the operation by the virtual system; and
    if the host system has responded to the operation, not responding to the operation by the virtual system.

7. The terminal of claim 6, wherein the operations comprise:
  acquiring, by the host system, a driver layer parameter, consisting of analog signals, of each functional module of the terminal;
  converting the driver layer parameter into an application layer parameter consisting of logical signals according to a preset rule; and
  starting, by the host system, functional modules one by one according to application layer parameters.

8. The terminal of claim 7, wherein the operations comprise:
  determining a functional module required to be started for starting the application program and an initialization parameter of the application program;
  calling a pre-stored application layer parameter of the functional module required to be started, wherein the pre-stored application layer parameter is previously extracted and stored by the virtual system when the functional module is started;
  starting the functional module required to be started according to the pre-stored application layer parameter; and
  starting the application program according to the initialization parameter by using the functional module that is started.

9. The terminal of claim 6, wherein the operations comprise:
  determining a functional module required to be started for starting the application program and an initialization parameter of the application program;
  calling a pre-stored application layer parameter of the functional module required to be started, wherein the pre-stored application layer parameter is previously extracted and stored by the virtual system when the functional module is started;
  starting the functional module required to be started according to the pre-stored application layer parameter; and
  starting the application program according to the initialization parameter by using the functional module that is started.

10. The terminal of claim 6, wherein the operations comprise:
  determining, by the virtual system, a thread for responding to the operation in the host system;
  determining, by the virtual system, whether the thread has been occupied;
  if the thread has been occupied, determining that the host system has responded to the operation; and
  if the thread has not been occupied, determining that the host system has not responded to the operation.

11. A non-transitory computer readable storage medium storing one or more programs that, when performed by a terminal, perform operations comprising:
  after a minimum system of the terminal is started, loading a preset quick start interface through a display module of the minimum system, wherein the quick start interface comprises at least a plurality of virtual hotkeys that identify application programs to be started;
  in response to an operation on a virtual hotkey of the quick start interface indicating starting an application program to be started, executing, by a virtual system, an operation of starting the application program that corresponds to the virtual key;

after the minimum system of the terminal is started, executing, by a host system, an operation of starting a current operating system while the operation of starting the application program is executed by the virtual system, wherein the virtual system and the host system of the terminal share physical resources of the terminal;

mapping, by the virtual system, data produced by starting the application program to the host system, to indicate to the host system to run the application program according to the data produced by starting the application program after the host system receives the data;

before the virtual system maps the data produced by starting the application program to the host system, the operations further comprise:

after the virtual system detects an operation of a user on the application program that is started, determining, by the virtual system, whether the host system has responded to the operation;

if the host system has not responded to the operation, responding to the operation by the virtual system; and if the host system has responded to the operation, not responding to the operation by the virtual system.

12. The storage medium of claim 11, wherein the operations comprise:

acquiring, by the host system, a driver layer parameter, consisting of analog signals, of each functional module of the terminal;

converting the driver layer parameter into an application layer parameter consisting of logical signals according to a preset rule; and starting, by the host system, functional modules one by one according to application layer parameters.

13. The storage medium of claim 12, wherein the operations comprise:

determining a functional module required to be started for starting the application program and an initialization parameter of the application program;

calling a pre-stored application layer parameter of the functional module required to be started, wherein the pre-stored application layer parameter is previously extracted and stored by the virtual system when the functional module is started;

starting the functional module required to be started according to the pre-stored application layer parameter; and starting the application program according to the initialization parameter by using the functional module that is started.

14. The storage medium of claim 11, wherein the operations comprise:

determining a functional module required to be started for starting the application program and an initialization parameter of the application program;

calling a pre-stored application layer parameter of the functional module required to be started, wherein the pre-stored application layer parameter is previously extracted and stored by the virtual system when the functional module is started;

starting the functional module required to be started according to the pre-stored application layer parameter; and starting the application program according to the initialization parameter by using the functional module that is started.

15. The storage medium of claim 11, wherein the operations comprise:

determining, by the virtual system, a thread for responding to the operation in the host system;

determining, by the virtual system, whether the thread has been occupied;

if the thread has been occupied, determining that the host system has responded to the operation; and if the thread has not been occupied, determining that the host system has not responded to the operation.

* * * * *